July 13, 1954     M. L. POLANYI ET AL     2,683,394
WIDE APERTURE OPTICAL PROJECTION LENS SYSTEM
Filed Sept. 8, 1951
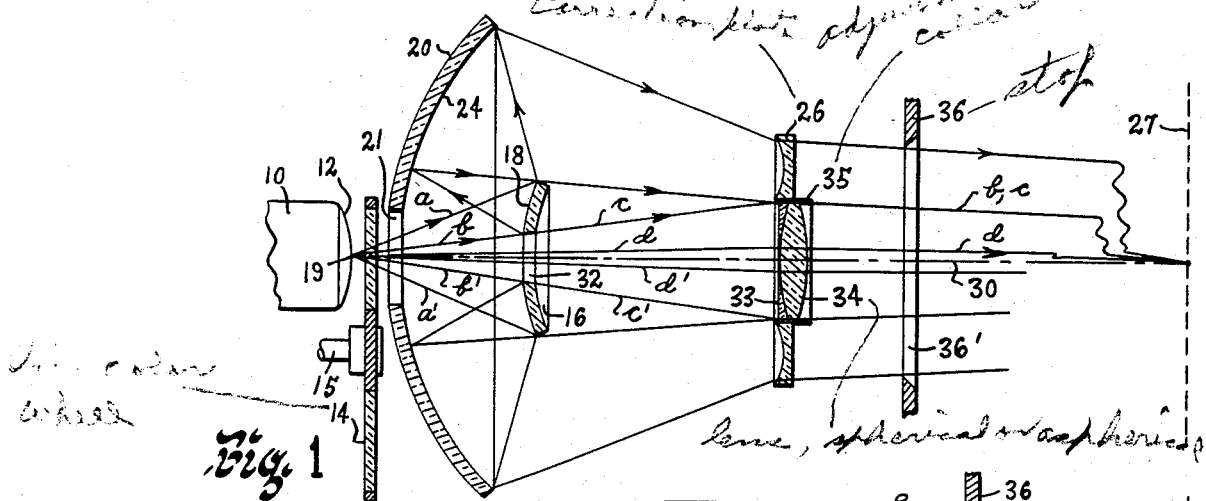
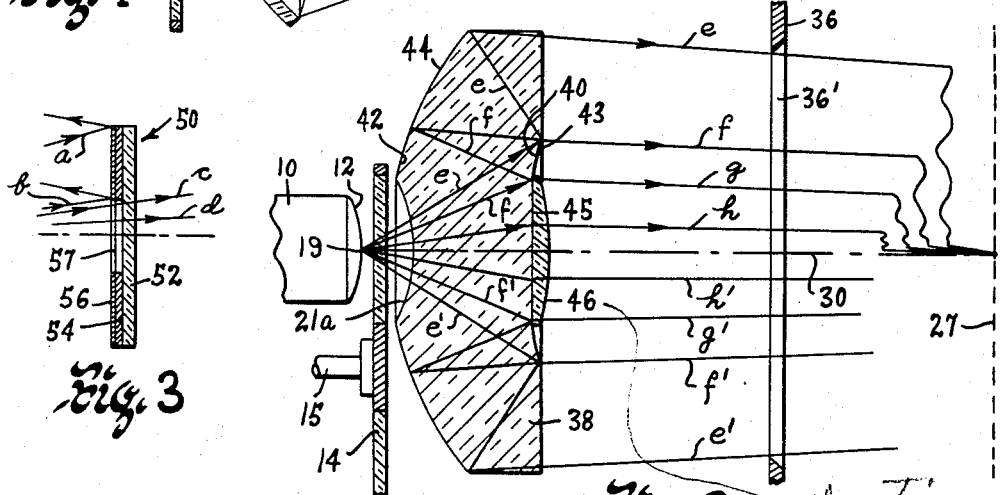
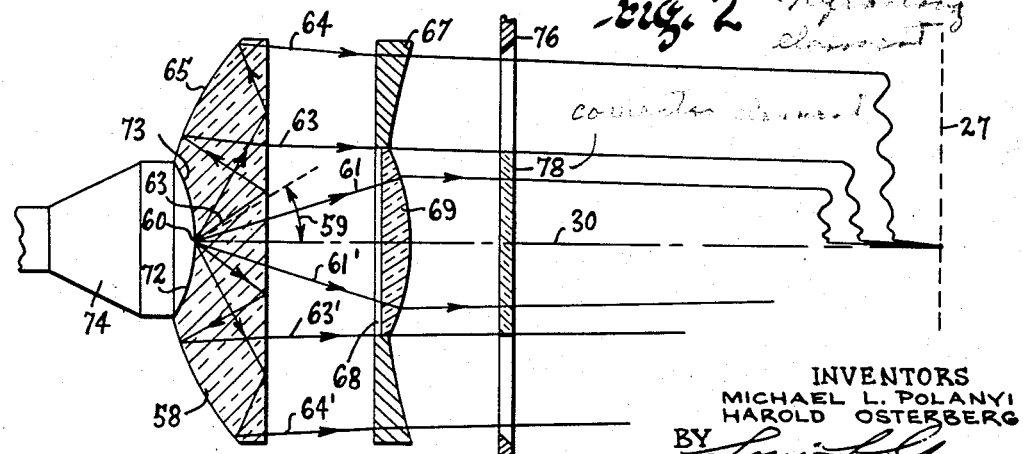
INVENTORS
MICHAEL L. POLANYI
HAROLD OSTERBERG
ATTORNEYS Patented July 13, 1954

2,683,394

UNITED STATES PATENT OFFICE 2,683,394

WIDE APERTURE OPTICAL PROJECTION LENS SYSTEM

Michael L. Polanyi and Harold Osterberg, Stamford, Conn., assignors to American Optical Company, Southbridge, Mass., a voluntary association of Massachusetts Application September 8, 1951, Serial No. 245,664

7 Claims. (Cl. 88—57)

This invention relates to wide aperture image-forming optical systems of the projection type, and more particularly to such an optical system which combines a refracting system and a reflecting system to form a composite system having exceedingly high optical efficiency.

Reflecting type image-forming optical systems equipped with Schmidt corrector elements or the like have, of late, been employed extensively with television receivers for projecting enlarged images of the pictures appearing upon the face of the cathode ray tube thereof upon a viewing screen spaced at a predetermined distance from the tube. Some of these systems of earlier construction have employed means providing a single reflection while others have employed means providing two or more reflections. An advantage of the latter type of system is that it may be "folded" or foreshortened thereby, and this is often desirable in order to reduce the overall dimensions of the receiving set cabinet into which the system is built while still having the dimensions of the system long enough to provide satisfactory optical performance.

It has been found that the optical efficiency of such a folded double reflection type image-forming system may be materially increased, however, by following the teachings of the present invention wherein an additional refracting element or elements are provided in such a system and in modifying the system in such a way that light previously unused or "lost" by earlier systems can now be utilized for increasing the brightness of the projected image being formed upon the associated viewing screen.

It is, accordingly, an object of the present invention to provide an image-forming optical system employing in combination reflecting and refracting optical elements in such a way that a greater quantity of the light rays from an object or picture at the object plane of the optical system may be utilized in forming an image thereof at a conjugate image plane which is of increased brilliancy.

It is an additional object of the present invention to provide optical means which may be easily and economically fabricated and easily and economically assembled in such a way as to effect a new combined refracting and reflecting image-forming optical system functioning in conjunction with a modified corrector element to provide increased light gathering and light transmitting ability.

Other objects and advantages of the invention will become apparent from a detailed description which follows when taken in conjunction with the accompanying drawing in which:

Fig. 1 is a diagrammatic cross-sectional view of a combined refracting and reflecting image-forming optical system embodying the present invention;

Fig. 2 is a cross-sectional view of a modified form of optical system embodying the present invention;

Fig. 3 is a cross-sectional view of a modified form of first reflecting element which may be employed in carrying the invention into effect, and Fig. 4 is another modified form of the optical system which may be used, if desired.

Referring particularly to Fig. 1 it will be seen that an optical system is presented in which the numeral 10 indicates generally a cathode ray type of image-forming tube having a fluorescent screen 12 disposed upon the front face thereof, and adjacent this part of the tube is disposed a tri-color wheel 14 of conventional construction or the like mounted for synchronous rotation upon a shaft 15. Axially aligned with the face of the tube 10 is a first small mirror 16 having a spherically curved convex reflecting surface 18 thereon and facing the screen 12 so as to receive light rays therefrom after same have been transmitted by the color wheel 14.

The reflecting surface 18, which is preferably a vacuum deposited aluminum or silver layer protected by an exposed layer of dielectric material, is so disposed upon the reflector 16 and the reflector 16 so spaced axially from the face of the tube, constituting the object plane of the optical system, that light rays from the luminous face 12 and incident thereon, for example, rays a and b emanating from a central point 19 will be reflected by surface 18 toward a second reflector 20 having a central aperture 21 axially aligned with the first reflector and having a concaved spherically curved reflecting surface 24 formed thereon and coated in a manner similar to surface 18. The rays a and b are thereafter reflected by this concaved curved surface 24 toward a Schmidt type corrector element 26 spaced at a predetermined distance from the reflecting surface 24 and of such aspherical curvature and refractive characteristics that substantially all of the spherical aberration normally present in the image-forming rays of such a reflecting type system will be removed. Accordingly, a spherical aberration free image will be formed at a conjugate image plane 27 a finite distance therefrom, such as upon an associated viewing screen (not shown) spaced axially at a predetermined distance from the corrector element.

Light rays similar to the rays a and b but impinging upon an opposite surface portion of the reflector 16 are indicated by a' and b'. These rays in like manner will be reflected by the first reflector to the concaved second reflector 20 and then directed through the corrector element 26 for imagery upon said viewing screen. In like manner light rays emanating from any and all luminous points upon the face 12 will be doubly reflected before passing through the corrector element 26 and before being imaged upon the viewing screen. If, however, the rays b and b' are now referred to, it will be appreciated that these rays are the rays of least angular value relative to the optical axis 30 and emanating from the point 19 which will pass through the optical system and reach the viewing screen. Nevertheless, an angle of quite material size is subtended by rays b and b'. It will be readily apparent that all light rays leaving the axial point 19 on the face of the cathode ray tube at a lesser angular value than rays b and b' would normally be ineffective and accordingly lost as image-forming rays except for the novel features and arrangement of the present invention.

In the present invention as shown by Fig. 1 a central clear light aperture is formed in the first reflector 16 by the provision of an opening 32 therein so that light rays, such as rays c, c' d and d', intermediate the rays b and b' will pass through this reflector. The corector element 26 also has been modified somewhat over corrector elements of earlier optical systems by providing centrally therein an opening 33 and in this opening a convergent refracting element or component, such as doublet 34, of suitable refractive indices, thicknesses and curvatures, which may be spherical or slightly aspherical, may be placed so that the rays passing through the clear aperture 32 in the first reflective, and included between the rays c and c' will be intercepted by this refracting element 34 in such a manner as to be brought to a focus at the image plane 27. If desired, a thin walled short sleeve 35 for allowing slight longitudinal adjustment of element 34 can be provided within the aperture 33, and obviously, where highest quality of imagery is desired the element 34 may be made in the form of a doublet or like component. If the refracting element 34 is of a magnifying power equal to that provided by the reflecting surfaces 18 and 24 and corrector element 26 and if these parts are carefully optically aligned, two images of equal size will be produced and will coincide upon the viewing screen. In this manner a combined image of increased brilliance upon the viewing screen, as compared to an image formed by the reflecting surfaces alone, can be readily provided. A diaphragm stop for the system is shown at 36 and has a clear aperture 36' therein.

A somewhat modified optical system embodying the present invention is shown in Fig. 2 wherein the reflecting convex and concave surfaces 40 and 42, corresponding to surfaces 18 and 24 of Fig. 1, are formed upon a common optical element 38 by having annular metallic reflecting coatings 43 and 44 applied thereto. Either the surface 40 or the surface 42 may be additionally slightly aspherically curved, if desired, so as to function in directing reflected rays e, e', f and f' toward the image plane 27 and in removing spherical aberration from the system; in much the same manner as accomplished in Fig. 1 by the correcting element 26. One advantage of such an optical system over that shown in Fig. 1 is obtained from the fact that the reflecting surfaces, which are preferably formed as metallic coatings of aluminum or silver, are interior surfaces and accordingly are less susceptible to injury, scratches, oxidation and the like. A central clear area 45 which may be in some systems of such size as to intercept a solid cone of light of as much as or even more than 60 degrees apex angle, however, is provided within the annular coated reflecting surface 40 and to this surface 45 may be cemented or otherwise secured a refracting optical element 46, or doublet component, of suitable refractive index, thickness, curvature, etc. so as to refract light rays g, g', h and h' from the object point 19 and passing through the spherically concaved clear aperture 21a on the face of the element 38, through the element 38 and through the clear surface 45 and focus same at the image plane 27 of the system. Here again, in like manner, use is made of the central bundle of light rays received inwardly of the reflected rays f and f' for increasing the brilliance of the projected image upon the viewing screen.

In Fig. 3 a modified form of first reflector, which may be used in a system much like that of Fig. 1, is shown at 50. This reflector may be formed, if desired, as a flat transparent plate or disc 52 coated first upon its outer annular area 54 with a metallic reflecting coating, such as vacuum deposited aluminum or silver, and then coated thereover by a protective reflection-increasing coating 56, of known form. If desired the central portion within this annular area 54 may have its surface incident to the light rays coated, at at 57, with some known reflection-reduction coating.

In Fig. 4 is another modified form of optical system which may be used and which may comprise a transparent optical element 58 of suitable material having a refractive index so chosen that its critical angle of total reflection 59 is utilized to advantage. For example, this angle, which may preferably range from 30 to 40 degrees, will allow rays, such as indicated by rays 61 and 61', from an object point such as 60 and less than the critical angle to be transmitted while rays of greater angularity, such as those shown at 63, 63', 64 and 64', to be reflected toward curved surface 65 and then reflected by surface 65 toward the corrector element 67. The rays 61 and 61' on the other hand will pass, without such reflection, through convergent element 69 in the aperture 68 therein and to the conjugate image plane 27. In this manner, likewise, a refracting system and a reflecting system join together in producing an image of increased brightness. An annular portion of convex surface 65 may be aluminum or silver coated to increase reflectivity. While the forward surface 70 of the element 58 is preferably made plano, an opposite surface 72 within the annular surface 65 is formed as a concaved surface to fit the curvature of the face of an associated cathode ray tube 74 to which it may be cemented or otherwise secured, thereby eliminating air-glass surfaces therebetween. A corrector element for the central refracted light rays may be employed at the plane of the diaphragm 76, if desired, as indicated at 78.

We claim:

1. A composite image-forming optical system comprising supporting means providing a first annular reflecting surface and a light aperture centrally thereof, a second annular reflecting surface on said supporting means facing said first annular reflecting surface and a second light aperture centrally thereof, said second annular reflecting surface being optically aligned and spaced a predetermined distance from said first annular reflecting surface along a common optical axis, said first and second annular reflecting surfaces being of such controlled shapes, with at least one surface spherically curved, as to jointly form a reflecting image-forming optical system having an object plane a predetermined finite axial distance from said first annular reflecting surface and a conjugate image plane a predetermined finite axial distance from said second annular reflecting surface, said surfaces providing at said image plane a real image of predetermined magnification when an object is located at said object plane, convergent refracting lens means of predetermined curvature and refractive characteristics so disposed upon said common optical axis between said object plane and said image plane and so optically aligned with said annular reflecting surfaces as to intercept light rays emanating from an object at said object plane and passing through the light apertures inwardly of said annular reflecting surfaces and focus said rays at said image plane as a real image having a magnification substantially equal to the magnification of the image formed by said reflecting surfaces and in substantial coincidence therewith.

2. A composite image-forming optical system comprising supporting means providing a first at least partially annular reflecting surface, a second at least partially annular reflecting surface on said supporting means facing said first reflecting surface, said second reflecting surface being optically aligned and spaced a predetermined distance from said first reflecting surface along a common optical axis, first and second light apertures disposed between said first and second reflecting surfaces, respectively, and said common optical axis, and each of said apertures occupying the major portion of the area therebetween, said first and second reflecting surfaces being of such controlled shapes, with at least one surface spherically curved, as to jointly form a reflecting image-forming optical system having an object plane a predetermined finite axial distance from said first reflecting surface and a conjugate image plane a predetermined finite axial distance from said second reflecting surface, said reflecting surfaces providing at said image plane a real image of predetermined magnification when an object is located at said object plane, convergent refracting lens means of predetermined curvature and refractive characteristics so disposed upon said common optical axis between said object plane and said image plane and so optically aligned with said reflecting surfaces as to intercept light rays emanating from an object at said object plane and passing through the light apertures inwardly of said reflecting surfaces and focus said rays at said image plane as a real image having a magnification substantially equal to the magnification of the image formed by said reflecting surfaces and in substantial coincidence therewith.

3. A composite image-forming optical system comprising supporting means providing a first at least partially annular reflecting surface, a second at least partially annular reflecting surface on said supporting means facing said first reflecting surface, said second reflecting surface being optically aligned and spaced a predetermined distance from said first reflecting surface along a common optical axis, first and second light apertures disposed between said first and second reflecting surfaces, respectively, and said common optical axis, and each of said apertures occupying the major portion of the area therebetween, said first and second reflecting surfaces being of such spherical curvatures as to jointly form a reflecting image-forming optical system having an object plane a predetermined finite axial distance from said first reflecting surface and a conjugate image plane a predetermined finite axial distance from said second reflecting surface, said reflecting surfaces providing at said image plane a real image of predetermined magnification when an object is located at said object plane, a corrector plate positioned in optical alignment with said reflecting surfaces, said corrector plate being at least partially annular in shape and of such controlled curvatures and refractive characteristics and so positioned in said system as to eliminate to a large degree the inherent spherical aberration of said reflecting surfaces, convergent refracting lens means of predetermined curvature and refractive characteristics and so disposed between said object plane and said image plane and so optically aligned with said reflecting surfaces as to intercept light rays emanating from an object at said object plane and passing through the light apertures inwardly of said reflecting surfaces and focus said rays at said image plane as an image having a magnification substantially equal to the magnification of the image formed by said reflecting surfaces and in substantial coincidence therewith.

4. An image-forming optical system comprising supporting means providing a first at least partially annular reflecting surface, a second at least partially annular reflecting surface on said supporting means facing said first reflecting surface, said second reflecting surface being optically aligned and spaced a predetermined distance from said first reflecting surface along a common optical axis, first and second light apertures disposed between said first and second reflecting surfaces, respectively, and said common optical axis, and each of said apertures occupying the major portion of the area therebetween, said first and second reflecting surfaces being of such controlled shapes, with at least one surface aspherically curved, as to jointly form a reflecting image-forming optical system having an object plane a predetermined finite axial distance from said first reflecting surface and a conjugate image plane a predetermined finite axial distance from said second reflecting surface, said reflecting surfaces providing at said image plane a real image of a predetermined magnification when an object is located at said object plane, convergent refracting lens means of predetermined curvature and refractive characteristics so disposed upon said common optical axis between said object plane and said image plane and so optically aligned with said reflecting surfaces as to intercept light emanating from an object at said object plane and passing through the light apertures inwardly of said reflecting surfaces and focus said rays at said image plane as a real image having a magnification substantially equal to the magnification of the image formed by said reflecting surfaces and in substantial coincidence therewith.

5. An image-forming optical system comprising transparent supporting means providing a first surface, a second curved surface on said supporting means forming a concave internal reflecting surface facing said first surface, said second curved surface being optically aligned and spaced a predetermined distance from said first surface along a common optical axis, said first and second surfaces jointly forming a reflecting image-forming optical system having an object plane a predetermined finite axial distance from said first surface and a conjugate image plane a predetermined finite axial distance from said second surface, said transparent supporting means being formed of material of such controlled refractive index as to provide a critical angle of predetermined value so that rays from said object plane reaching said first surface at a greater inclination than said angle will be transmitted therethrough and rays at a lesser inclination will be reflected thereby toward said second curved surface, said surfaces providing at said image plane a real image of predetermined magnification when an object is located at said object plane, convergent refracting lens means of predetermined curvature and refractive characteristics so disposed between said object plane and said image plane and so optically aligned with said first and second surfaces as to intercept light rays emanating from said object plane and transmitted without appreciable reflection through said first surface and focus said light rays at said image plane as a real image having a magnification substantially equal to the magnification of the image formed by said reflecting surfaces and in substantial coincidence therewith.

6. An image-forming optical system comprising supporting means providing a first at least partially annular reflecting surface, a second at least partially annular reflecting surface on said supporting means facing said first reflecting surface, said second reflecting surface being optically aligned and spaced a predetermined distance from said first reflecting surface along a common optical axis, first and second light apertures disposed between said first and second reflecting surfaces, respectively, and said common optical axis, and each of said apertures occupying the major portion of the area therebetween, said first and second reflecting surfaces being of such controlled shapes, with at least one surface aspherically curved as to jointly form a reflecting image-forming optical system having an object plane a predetermined finite axial distance from said first reflecting surface and a conjugate image plane a predetermined finite axial distance from said second reflecting surface, said surfaces providing at said image plane a real image of a predetermined magnification when an object is located at said object plane, convergent refracting lens means of predetermined curvature and refractive characteristics so disposed upon said common optical axis between said object plane and said image plane and so optically aligned with said reflecting surfaces as to intercept light emanating from an object at said object plane and passing through the light apertures inwardly of said reflecting surfaces and focus same at said image plane as a real image having a magnification substantially equal to the magnification of the image formed by said reflecting surfaces and in substantial coincidence therewith, and a corrector element optically aligned with said refractive lens means and having such refractive characteristics and so spaced from said lens means as to substantially remove all inherent spherical aberration from the image formed thereby.

7. An image-forming optical system comprising transparent supporting means providing a first surface, a second curved surface on said supporting means forming a concave internal reflecting surface facing said first surface, said second surface being optically aligned and spaced a predetermined distance from said first surface along a common optical axis, said first and second surfaces jointly forming a reflecting image-forming optical system having an object plane a predetermined finite axial distance from said first surface and a conjugate image plane a predetermined finite axial distance from said second surface, said transparent supporting means being formed of material of such controlled refractive index as to provide a critical angle of predetermined value so that rays from said object plane and reaching said first surface at a greater inclination than said angle will be transmitted therethrough and rays at a lesser inclination will be reflected thereby toward said second curved surface, said surfaces providing at said image plane a real image of predetermined magnification when an object is located at said object plane, convergent refracting lens means of predetermined curvature and refractive characteristics so disposed between said object plane and said image plane and so optically aligned with said first and second surfaces as to intercept light rays emanating from said object plane and transmitted without appreciable reflection through said first surface and focus said light rays at said image plane a real image having a magnification substantially equal to the magnification of the image formed by said reflecting surfaces and in substantial coincidence therewith, and a corrector element optically aligned with said refractive lens means and having such refractive characteristics and so spaced from said lens means as to substantially remove all inherent spherical aberration from the image formed thereby.

References Cited in the file of this patent

UNITED STATES PATENTS

| Number | Name | Date |
|---|---|---|
| 1,390,445 | Jenkins | Sept. 13, 1921 |
| 2,295,802 | Nicoll | Sept. 15, 1942 |
| 2,336,134 | Szegho | Dec. 7, 1943 |
| 2,336,379 | Warmisham | Dec. 7, 1943 |
| 2,378,301 | Kaprelian | June 12, 1945 |
| 2,454,144 | Epstein | Nov. 16, 1948 |
| 2,477,331 | Epstein | July 26, 1949 |